United States Patent
Kugle

(10) Patent No.: US 6,546,825 B1
(45) Date of Patent: Apr. 15, 2003

(54) ACTUATOR

(75) Inventor: Jens Kugle, Risskov (DK)

(73) Assignee: Kugle Holding A/S, Risskov (DK)

( * ) Notice: Subject to any disclaimer, the term of this patent is extended or adjusted under 35 U.S.C. 154(b) by 0 days.

(21) Appl. No.: 09/958,878

(22) PCT Filed: Apr. 14, 2000

(86) PCT No.: PCT/DK00/00185

§ 371 (c)(1),
(2), (4) Date: Oct. 17, 2001

(87) PCT Pub. No.: WO00/63590

PCT Pub. Date: Oct. 26, 2000

(30) Foreign Application Priority Data

Apr. 21, 1999 (DK) .......................... 1999 00545

(51) Int. Cl.$^7$ .............................................. F16H 27/02
(52) U.S. Cl. ..................... 74/89.23; 74/89.37; 192/141; 384/275; 384/296
(58) Field of Search ............................ 74/89.23, 89.33, 74/89.37, 89.39; 192/138, 141, 148; 384/275, 276, 295, 296, 420

(56) References Cited

U.S. PATENT DOCUMENTS

| | | | | |
|---|---|---|---|---|
| 536,048 A | * | 3/1895 | Schofield | ..................... 384/296 |
| 2,660,281 A | * | 11/1953 | Ochtman | ..................... 192/141 |
| 2,701,478 A | | 2/1955 | Riess | |
| 3,046,062 A | * | 7/1962 | Wettstein | ..................... 384/29 |
| 3,178,957 A | | 4/1965 | Martens | |
| 3,277,736 A | | 10/1966 | Goodman | |
| 3,319,481 A | * | 5/1967 | Goodman | ..................... 74/89.37 |
| 3,563,106 A | | 2/1971 | Goodman | |
| 3,682,283 A | * | 8/1972 | Sato | ..................... 192/141 |
| 4,065,979 A | | 1/1978 | Killian | |
| 4,479,398 A | | 10/1984 | Watanabe | |
| 4,644,811 A | | 2/1987 | Tervo | |
| 4,846,011 A | * | 7/1989 | Gaffney | ..................... 74/89.38 |
| 5,088,339 A | | 2/1992 | Lochmoeller | |
| 5,127,285 A | * | 7/1992 | Granhom | ..................... 74/527 |
| 5,137,400 A | * | 8/1992 | Sagara et al. | ............... 409/231 |
| 5,461,935 A | * | 10/1995 | Hill | ..................... 74/89.38 |
| 5,673,593 A | | 10/1997 | Lafferty | |

FOREIGN PATENT DOCUMENTS

DE 1065241 9/1959

* cited by examiner

Primary Examiner—Thomas R. Hannon
Assistant Examiner—Timothy McAnulty
(74) Attorney, Agent, or Firm—James Creighton Wray; Merra P. Narasimhan

(57) ABSTRACT

There is described an actuator comprising an outer tube and an inner tube. In the actuator there is provided a spindle co-operating with a bushing for creating the displacement of the actuator by means of a motor. In order to establish an end stop in a secure way for preventing a wedging of the spindle and the bushing in extreme positions for the actuator, the bushing is disposed rotatable in relation to both tubes as it is arranged rotatable in a bushing housing. The actuator is arranged so that friction between the bushing and the bushing housing is greater that the friction occurring between the spindle and the bushing. Hereby rotation of the spindle will displace the bushing along the spindle until it reaches an extreme position. By an extreme position a pin on the bushing will hit a pin mounted in the spindle. At contact between the two pins the friction between the bushing and the housing is overcome, whereby the bushing will perform a continuous rotation together with the spindle without any risk of its wedging against and end face in the tubes.

10 Claims, 2 Drawing Sheets

US 6,546,825 B1

ACTUATOR

BACKGROUND OF THE INVENTION

The present invention concerns a linear actuator.

By actuators there is the problem that the bushing at the end of its travel abuts on a surface in one of the tubes and thereby may be wedged. Hereby a further activation for moving in the opposite direction may be impeded or even made impossible. In order to avoid the bushing hitting end faces and being wedged, the actuators are provided with end stops which may be designed in various ways.

Thus it is known to provide actuators of the kind mentioned in the introduction with end stops which are furnished as sensors disposed at the outside of the tubes and which interact with magnets provided on the bushing. These end stops may be movable and disposed apart from the ends of the outer tube. As the sensors register the presence of the magnet, a signal is transmitted to the actuator motor which is deactivated. Hereby the continuous rotation of the spindle is stopped and engagement of the end surfaces is prevented. This actuator is, however, relatively expensive, and there will be a risk of failure if persons unintendedly bump on the sensors so that they are displaced and thereby give off signal at the wrong time.

Actuators are also known where attempts have been made to prevent wedging by providing the bushing with a rubber sleeve for abutting on end faces in the tubes. However, a rubber sleeve will not prevent the wedging, but only reduces the force to be overcome by activation for movement in the opposite direction. Thus there will still be need for a motor that may yield sufficient large force to overcome the wedging, and which hence becomes unnecessarily expensive. Furthermore, a wedging may still be so effective that movement in opposite direction is impossible.

Also, it is known with an actuator based on a slip coupling between the bushing and the housing. This actuator is based on a bushing which is built from a number of elements which via spring forces are to be held in predetermined positions. The construction is technically complicated and therefore expensive. Furthermore, the many interacting elements will imply risk of erratic performance.

A common feature of the prior art actuators is thus that they are relatively complicated and therefore expensive as well as there is a risk of faulty performance in the many interacting elements. For many years there has existed a need for actuators that are reliable and also inexpensive. For example, this is a need in various equipment for aiding the handicapped, such as wheel chairs with swivelling or pivotable seats and backs, and in beds with mutually pivotable sections to facilitate alighting and entering, and for making the bed comfortable for the user.

SUMMARY OF THE INVENTION

It is the object of the present invention to indicate an actuator of the kind mentioned in the introduction and where in a technically simple way there is provided security against wedging of spindle and bushing in extreme positions as slip may occur between the elements of the actuator.

This is achieved according to the present invention with an actuator which is peculiar as described in the characterising part of claim 1.

Preferably, the flange also has sloping lateral faces forming an angle between 15 and 60° relative to a plane perpendicular to the centre axis of the spindle. Preferably, the pitch angle for the thread is less than the angle of the sloping lateral faces as measured relative to a plane perpendicular to the centre axis of the spindle.

In a preferred embodiment, the first tube is constituted by the outer tube and the second tube of the inner tube. However, it is within the possibilities of the skilled in the art to design the actuator within the scope of the invention so that the first tube is constituted by the inner tube and the second tube simultaneously is constituted by the outer tube.

In normal use, where the two tubes of the actuator are to be displaced mutually within their normal range, the difference in friction between spindle and bushing and between bushing and housing will cause the spindle to rotate inside the bushing and thereby causes the desired mutual displacing of the two tubes. In an extreme position, the end stop will prevent a further mutual displacement of the two tubes so that the friction between spindle and bushing momentarily rises very strongly and thereby becomes greater than the friction between the bushing and the housing. Hereafter the bushing may rotate freely together with the spindle as long as this is rotating in the same direction. Therefore, the bushing will not be pressed into a wedged engagement with an end surface in the tube.

In a preferred embodiment of the invention, though not delimited to this embodiment only, the end stop comprises stop means on the spindle and stop means on the bushing interacting by mutual impact, whereby the bushing overcomes the friction with the bushing housing and thereby can rotate together with the spindle by a continuous rotation of this.

When the rotation of the spindle is stopped and activated for rotation in the opposite direction, the difference in friction will again cause the spindle only to rotate and thereby the mutual displacing of the two tubes is established as the bushing does not rotate because of the frictional engagement with the housing.

The actuator is technically very simple as it only comprises the three interacting elements spindle, bushing and bushing housing for establishing the end stops. These elements are designed with geometrical shapes ensuring the correct functioning. These geometrical shapes may be calculated in simple ways from common algorithms for determining frictional connections and screw connections. From these algorithms moments may be determined so that for given loads of the actuator and for given dimensions of elements of the actuator there will always be a greater moment for the bushing (the slip coupling) than for the spindle.

According to an advantageous embodiment, the actuator is made in a particularly simple way in that the stop means of the spindle comprise a pin mounted in a radially extending boring and projecting outside the thread, and in that the stop means of the bushing comprises a pin mounted in an axially extending boring and projecting from the bushing in a radial position which makes possible engagement with the pin of the spindle. Alternatively, the stop means of the bushing may comprise an axially extending surface provided in a recess which is formed in an end face of the bushing and which has a radial extension allowing the pin of the spindle to protrude into the recess by rotation of the spindle. This recess may be formed as a boring in parallel with the centre axis for the spindle or as a helical recess which is ended with a radially extending side wall.

It is also possible that the stop means of the spindle comprise a pin mounted in an axially extending boring in a flange projecting from the spindle, and that the stop means of the bushing comprise a pin mounted in an axially extending boring and projecting from the bushing in a radial position making possible engagement with the pin of the spindle. This embodiment is particularly suitable for spindles with small diameter and consequently small amount of material in which a boring for the pin may be formed. In such a spindle there is risk of weakening the material by boring in the spindle.

In order to make the mounting so simple as possible, the bushing housing is preferably provided in two parts between which the recess is formed for accommodating the flange on the bushing, and that the two parts of the bushing housing are screwed together around the flange by means of a screw connection. The bushing housing is screwed fast at the end of the inner tube.

BRIEF DESCRIPTION OF THE DRAWINGS

The invention will now be explained in more detail with reference to the accompanying drawing, where.

DETAILED DESCRIPTION OF THE INVENTION

Figure 1:
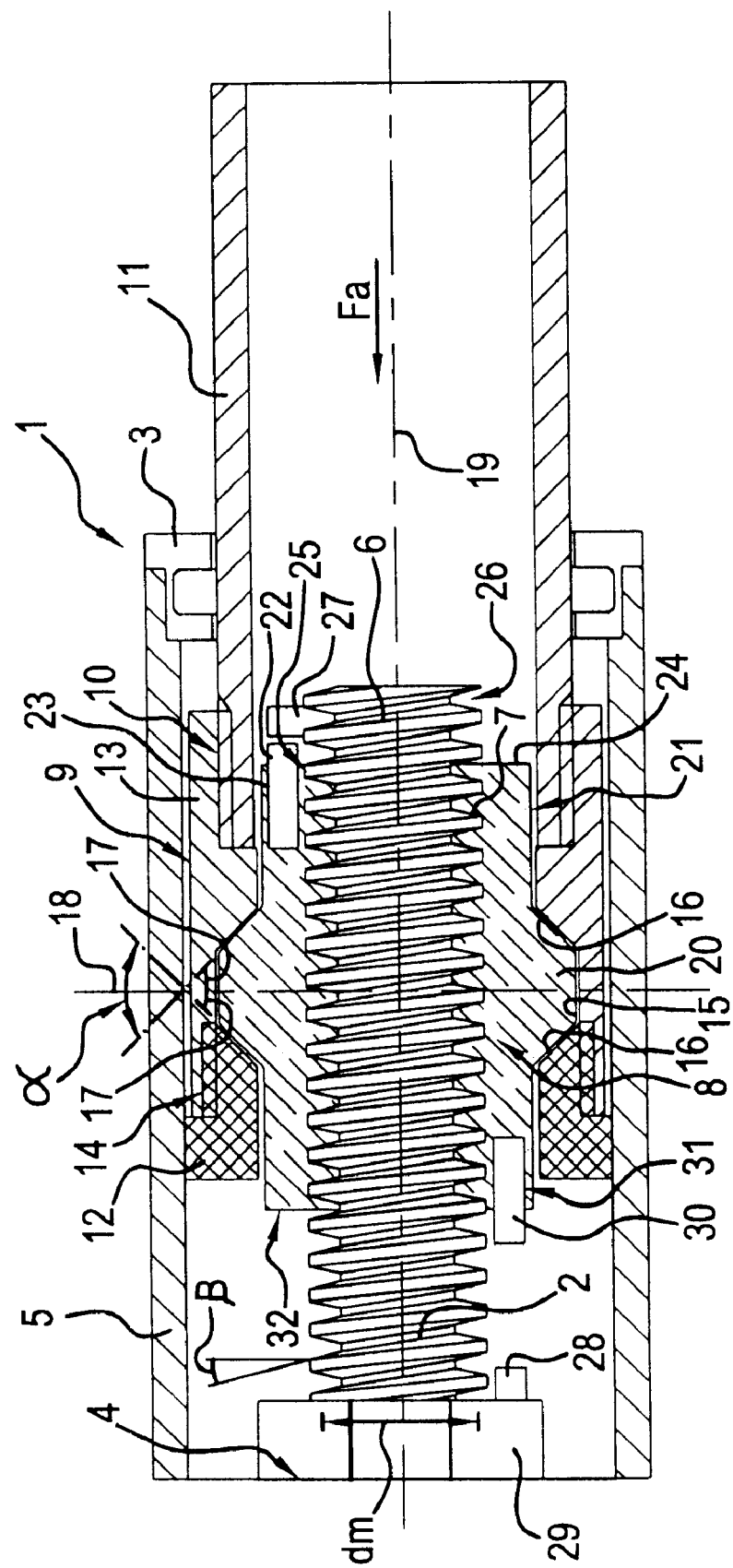
FIG. 1 shows a partial, longitudinal section through a part of a first embodiment of an actuator according to the invention.

In the different figures of the drawing, identical or corresponding elements will have identical designations, and no detailed explanation will be given in connection with each of the figures.

In FIG. 1 there is illustrated a part of an actuator 1 which illustrates the connection between a spindle 2 and a bushing 8. The spindle 2 is connected with a motor 4 which is stationary and fastened to an outer tube 5. The motor provides the rotation of the spindle. The spindle 2 is provided with a thread 6 engaging a thread 7 in the bushing 8. The bushing 8 is mounted rotatable in a bushing housing 9 which via a screw connection 10 is fastened to an inner tube 11. By activating the motor 4 it is thus possible to establish a mutual displacing of the two tubes 5,11 as the friction between the bushing 8 and the housing 9 is greater than the friction between the bushing 8 and the spindle 2.

In order to achieve an easy mounting, the housing 9 is made of a first part 12 and a second part 13 which are mutually connected via a screw connection 14. The housing is made with an annular recess 15 having sloping lateral faces 16 which are arranged under an angle 17 of about 45° in relation to a plane 18 perpendicular to the centre axis 19 of the spindle. The bushing 8 is mainly cylindrical and has a flange 20 facing outward from the cylindrical surface 21 and which is received rotatable in the recess 15. After mounting the bushing housing 9 in the outer tube, this is closed with a scraper ring 3. At the not shown ends, the outer tube and the inner tube are connected with the elements to be imparted a mutual displacement by means of the actuator. The tubes 5,11 will thus not rotate when the actuator is used.

In the bushing 8 there is provided stop means in the shape of a pin 22 mounted in an axially extending boring 23 in a first end face 24. This pin 22 is placed in a radial position just outside the upper side 25 of the thread 6 of the spindle. At the outer end of the spindle 2 there is a radially extending boring in which there is mounted a pin 27 the outer end of which extends beyond the upper side of the spindle thread to a radial position where it may engage the pin 22 when the bushing reaches one of its extreme positions.

At the inner end of the spindle close to the motor, a pin 28 is disposed in an axially extending boring in a flange 29 which is rotationally connected with the spindle 2. The pin 28 is placed for interacting with a pin 30 mounted in an axially extending boring 31 in a second end face 32 of the bushing 8. The pins are retained in the boring via an interference fit, via screw connection, via welding or in another way.

When the pins 22 and 27, or the pins 28 and 30, engage, the friction between the flange 20 of the bushing and the recess 15 is overcome so that the bushing 8 may rotate together with the spindle 2. Hereby it is possible to avoid the end faces 24 or 32 of the bushing engage the end faces in the tubes 5,11.

Figure 2:
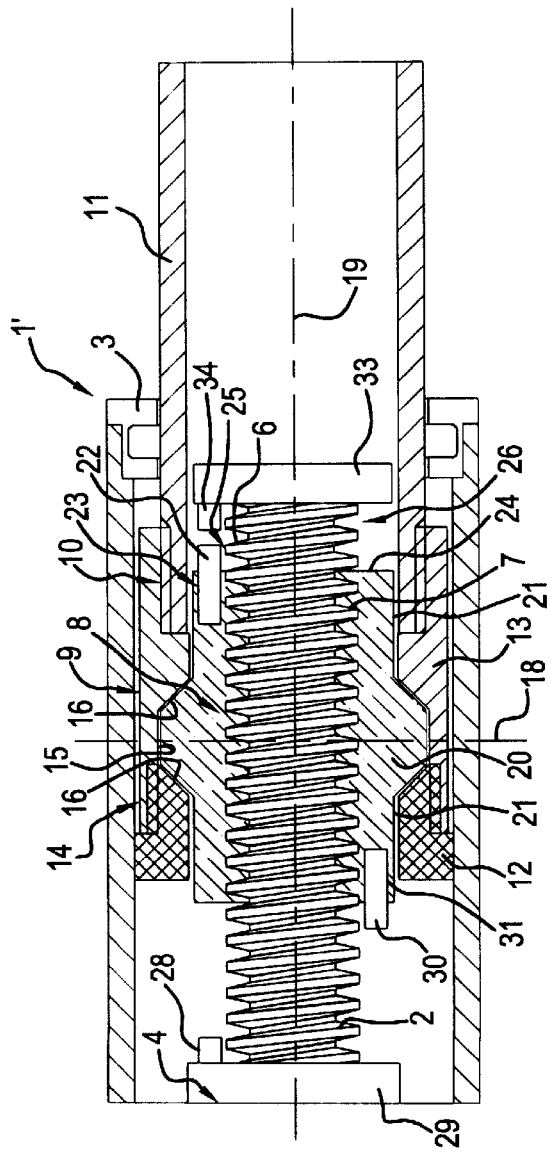
FIG. 2 shows a section corresponding to FIG. 1 for illustrating a second embodiment of the actuator according to the invention.

The actuator 1' shown in FIG. 2 differs from the one in FIG. 1 by different stop means at the outer end 26 of the spindle 2. Here we are speaking of a flange 33 provided with an axially extending boring in which there is mounted a pin 34 intended for engaging the pin 22 in the bushing 8.

Figure 3:
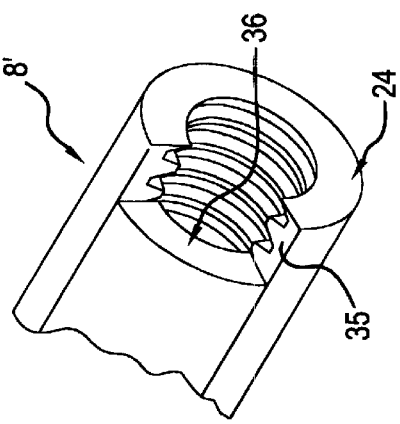
FIG. 3 is a partial perspective view of a bushing for a further embodiment of an actuator according to the invention.

In FIG. 3 there is shown a bushing 8' which instead of a pin has an stop face formed by the side wall 35 in a recess in the shape of an axially extending boring 36 in the end face 24 or 32 of the bushing. A pin 27 at an outer or inner end of the thread 6 of the spindle may abut on the side wall of the boring 36 when the bushing 8 reaches its extreme positions on the spindle.

Figure 4:
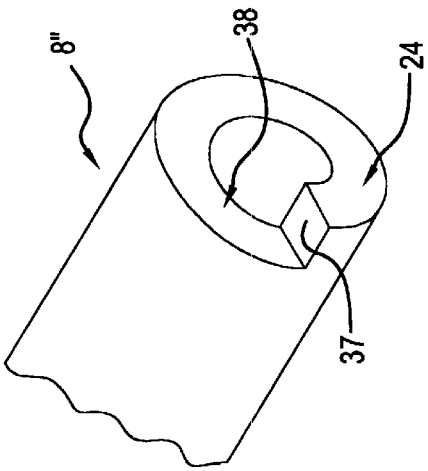
FIG. 4 is a view corresponding to FIG. 3 for illustrating a further embodiment.

In FIG. 4 the bushing 8" is provided with an axially extending stop face 37 which is formed in a sloping recess 38 in an end face 24 or 32 of the bushing. The stop face 37 has a radial extension allowing the spindle pin 27 protruding into the recess by rotation of the spindle by an outer or inner end.

By the shown embodiments of bushings it is possible in a simple way to get a well-defined stop face and thereby well-defined extreme positions for the tubes 5 and 11. Hereby it is possible to utilize an optimal length of the actuator as no safety distance is necessary as is e.g. the case when magnetic end stops are used, in order to avoid the bushing knocking into the end faces in the tubes. Until the stop means are brought into contact, rotation between spindle and bushing takes place due to the chosen frictional conditions. Contact occurs at a well-defined position and thereafter spindle and bushing will rotate together.

By unique formulas it is possible to determine friction between bushing and spindle/housing. These formulas have the following wording:

$$M=(\mu F_a \tfrac{1}{2} d_m)(\sin \tfrac{1}{2}\alpha + \mu \cos \tfrac{1}{2}\alpha) \text{ for bushing/housing}$$

$$M=F_a \tfrac{1}{2} d_a \tan(\beta+\gamma) \text{ for bushing/spindle}$$

where:
$\mu$=coefficient of friction between the slipping surfaces
$F_a$=axial force, load exerted on the actuator
$d_m$=middle diameter for slip device—conical surface
$d_a$=middle diameter for threaded flange—spindle/bushing
$\alpha/2$=angle of the slip surfaces to the axis 1
$\beta$=pitch angle on the spindle thread
$\gamma$=arc tan($\mu$).

What is claimed is:

1. Actuator comprising a first tube and a second tube, of which one constitutes an inner tube and the other constitutes an outer tube, in which there are provided a threaded spindle for mutual displacement of the two tubes as said spindle engages a threaded bushing mounted in said first tube, while said spindle is mounted in said second tube, said actuator also comprising an end stop defining extreme positions for the mutual displacement of said tubes, where said bushing is rotatable in relation to both of said tubes as it is mounted rotatable in a bushing housing fastened in said first tube, where said bushing is arranged with friction in said bushing housing greater than the friction occurring between said spindle and said bushing when said actuator is between the extreme positions, wherein said bushing housing is provided with a largely cylindrical boring comprising an inward facing recess with sloping lateral faces, said bushing having a largely cylindrical outer shape and comprising an outward facing circular flange accommodated in and filling up said recess of said housing as said flange also has sloping lateral faces.

2. Actuator according to claim 1, wherein said first tube is said inner tube and that said second tube is said outer tube.

3. Actuator according to claim 1, wherein said end stop comprises stop means on said spindle and stop means on said bushing co-operating by mutual impact, whereby said bushing overcomes the friction with said bushing housing and thereby may rotate together with said spindle.

4. Actuator according to claim 3, wherein said stop means of said spindle comprise a pin mounted in a radially extending boring and projecting outside a thread of said threaded spindle, and that the stop means of the bushing comprises a pin mounted in an axially extending boring and projecting from said bushing in a radial position making possible engagement with the pin of the spindle.

5. Actuator according to claim 3, wherein said stop means of the spindle comprise a pin mounted in a radially extending boring and projecting outside a thread of said threaded spindle, and that the stop means of the bushing comprises an axially extending surface provided in a recess which is formed in an end face of the bushing and which has a radial extension allowing the pin of the spindle to protrude into the recess by rotation of the spindle.

6. Actuator according to claim 3, wherein said stop means of said spindle comprise a pin mounted in an axially extending boring in a flange projecting from said spindle, and that said stop means of said bushing comprise a pin mounted in an axially extending boring and projecting from said bushing in a radial position making possible engagement with said pin of said spindle.

7. Actuator according to claim 1, wherein the angles for said sloping lateral faces are between 15 and 60° relative to a plane perpendicular to the centre axis of said spindle.

8. Actuator according to claim 1, wherein said bushing housing is provided in two parts between which said recess is formed for accommodating said flange on said bushing, and that said two parts of said bushing housing are screwed together around said flange by means of a screw connection, and that said bushing housing is screwed fast at the end of said inner tube.

9. Actuator according to claim 1, wherein the pitch angle of a thread of said threaded spindle, is less than the angle of said sloping lateral faces as measured relative to a plane perpendicular to the centre axis of said spindle.

10. Actuator according claim 1, wherein said spindle is designed so that said stop means may be placed at different positions along its length.

* * * * *